United States Patent [19]

Worth

[11] Patent Number: 5,335,690
[45] Date of Patent: Aug. 9, 1994

[54] WATER AND FERTILIZER DISPENSING APPARATUS

[76] Inventor: E. Wayne Worth, 620 Wisconsin St., Wisconsin Rapids, Wis. 54494

[21] Appl. No.: 120,918

[22] Filed: Sep. 15, 1993

[51] Int. Cl.⁵ .................................... B01D 11/02
[52] U.S. Cl. .................................. 137/268; 239/310; 422/261; 422/274
[58] Field of Search ............... 137/268; 422/255, 261, 422/274, 278, 264; 239/310, 317

[56] References Cited

U.S. PATENT DOCUMENTS

| | | | |
|---|---|---|---|
| 2,663,314 | 12/1953 | Palmer et al. | 422/261 X |
| 2,771,346 | 11/1956 | Lambers | 422/278 |
| 3,468,457 | 9/1969 | Martin | 239/310 X |
| 3,968,932 | 7/1976 | Kimmell | 137/268 X |
| 4,026,673 | 5/1977 | Russo | 137/368 X |
| 4,250,911 | 2/1981 | Kratz | 239/310 X |
| 5,053,206 | 10/1991 | Maglio et al. | 137/268 X |
| 5,188,294 | 2/1993 | Sealy et al. | 239/310 |

Primary Examiner—Martin P. Schwadron
Assistant Examiner—Kevin L. Lee

[57] ABSTRACT

A new and improved water and fertilizer dispensing apparatus includes a connector assembly for connecting to a source of pressurized water. A manually operated diverter valve assembly is connected to the water source connector assembly. The manually operated diverter valve assembly includes an input channel, a first output channel, a second output channel, and a selector valve assembly located between the input channel and both the first output channel and the second output channel. The selector valve assembly is used for manually selecting a water flow path from the input channel through either the first output channel, or the second output channel, or both the first output channel and the second output channel in combination. A mixing chamber is defined by a housing and is connected to the first output channel. The mixing chamber is used for containing a quantity of fertilizer (either solid or liquid) and a quantity of water for dissolving the fertilizer. An inflow nozzle assembly is connected to the first output channel within the mixing chamber. The inflow nozzle assembly is used for receiving water under pressure from the manually operated diverter valve assembly. The inflow nozzle assembly includes a plurality of apertures. An outflow aperture assembly is spaced from the inflow nozzle assembly by a predetermined distance, such that water entering the mixing chamber from the inflow nozzle assembly, the water traverses the predetermined distance along the first linear dimension, before entering the outflow aperture assembly.

12 Claims, 4 Drawing Sheets

WATER AND FERTILIZER DISPENSING APPARATUS

BACKGROUND OF THE INVENTION

1. Field of the Invention

The present invention relates generally to devices for spreading fertilizer, and more particularly, to a device especially adapted for dispensing a blend of water and fertilizer.

2. Description of the Prior Art

Devices for dispensing fertilizer are well known in the art. The following U.S. patents disclose fertilizer dispensers: U.S. Pat. Nos. 3,468,457; 4,026,673; 4,033,509; 4,039,105; and 4,974,634. A number of disadvantages would be entailed by using the above-mentioned fertilizer dispensing devices. More specifically, U.S. Pat. No. 3,468,457 discloses a device for dispensing fertilizer in powder form. A disadvantage in using this device is that the device itself must be carried back and forth along the ground that is being treated. Moreover, after the powdered fertilizer is applied, it is often necessary to water the ground to permit the solid fertilizer is applied, it is often necessary to water the ground to permit the solid fertilizer to dissolve and soak into the ground. In this respect, it would be desirable if a fertilizer dispensing device were provided that permitted application of the fertilizer to the ground without carrying the device back and forth over the ground being treated. In addition, it would be desirable if a fertilizer dispensing device were provided which did not require subsequent watering of the ground after application of the fertilizer.

U.S. Pat. No. 4,026,673 discloses an apparatus for dissolving and dispensing fertilizer to either of two water streams of different character. A porous receptacle contains the fertilizer in solid form, and a water spraying device sprays water on the solid fertilizer to dissolve some of the solid fertilizer and permit a fertilizer solution to collect in the bottom of the device. Whether the water spray is on or off depends upon whether a predetermined amount of fertilizer solution is accumulated in the device. Then the fertilizer solution is blended with either one or the other of two water streams. There are a number of disadvantages associated with this device. A complex control mechanism controls dissolution of solid fertilizer material. The complex control mechanism includes a float, a system of levers connected to the float, and a water valve controlled by the system of levers. In this respect, it would be desirable if a fertilizer dispensing device were provided that avoided the use of a complex control system for dissolving solid fertilizer in water.

U.S. Pat. No. 4,033,509 discloses a lawn sprinkler and fertilizer dispenser in which a special pump is provided for pumping fluid solutions, suspensions, or mixtures of chemicals through the nozzle of the sprinkler. Provision of a separate pump is a complicating and expense entailing feature. In this respect, it would be desirable if a fertilizer dispensing device were provided that did not require the use of a separate fluid dispensing pump.

U.S. Pat. No. 4,039,105 discloses a fertilizer dispenser that is used with an ordinary garden hose. The fertilizer is contained in a tank which has a water input pipe and a water output pipe. Inside the tank there is a simple flow of water up from the bottom of the tank to the top of the tank. This simple flow of water may prevent a thorough mixing of the fertilizer and the water. In this respect, it would be desirable if a fertilizer dispensing device were provided that included structures which provided complex mixing patterns between water and fertilizer to assure adequate mixing of the water and fertilizer. Also, with this patent, there of four manually controlled valves disclosed for proper operation of the device. Such a complex of manually controlled valves gives a very large number of variations in specific valve settings. Such a complexity of manually set valve settings may be very difficult to duplicated from time to time. Moreover, such a complexity of manually set valves may be very confusing to properly operate leading to frustration and less than adequate operation. In this respect, it would be desirable if a fertilizer dispensing device were provided that employed only one valve for controlling blending of water with the fertilizer.

U.S. Pat. No. 4,974,634 discloses a liquid fertilizer metering system which employs a sealed container having a pocket supporting a pliable bag of liquid fertilizer which is metered into a restricted throat of a Venturi tube. This device requires fertilizer to be contained in special dispensing bag modules. In fact, such dispensing modules are not readily available. In this respect, it would be desirable if a fertilizer dispensing device were provided that did not utilized fertilizer supply modules that may not be readily available. In addition, this device employs a Venturi for aiding dispensing action. Venturis, by their very nature, are tubes of small internal diameter. As such, they are readily clogged, especially when the material they are used with are solids dissolved in water. In this respect, it would be desirable if a fertilizer dispensing device were provided that did not employ a Venturi tube for dispensing the fertilizer.

There are additional features that would be desired in a water and fertilizer dispensing apparatus. Preferably, the water and fertilizer dispensing apparatus would be readily portable so it can readily be carried from location to location. The water and fertilizer dispensing apparatus would preferably contain nozzles in its interior that directed water flow to facilitate good mixing between the water and the fertilizer. The apparatus should contain appropriate automatically operating check valves that prevented unwanted flow of water when the apparatus was turned off.

When a quantity of fertilizer is first added to a container and after an initial quantity of water is then added to the container to dissolve the fertilizer, quite a bit of initial mixing of the water and the fertilizer should take place before water flow is begun. In this respect, it would be desirable if a fertilizer dispensing device were provided that had a capability to manually mix an initial quantity of water with the fertilizer before the automatic mixing would begin by virtue of the water flow.

Thus, while the foregoing body of prior art indicates it to be well known to use fertilizer dispensers, the prior art described above does not teach or suggest a water and fertilizer dispensing apparatus which has the following combination of desirable features: (1) permits application of the fertilizer to the ground without carrying the device back and forth over the ground being treated; (2) does not require subsequent watering of the ground after application of the fertilizer; (3) avoids the use of a complex control system for dissolving solid fertilizer in water; (4) does not require the use of a separate fluid dispensing pump; (5) provides complex mixing patterns between water and fertilizer to assure adequate mixing of the water and fertilizer; (6) employs only one manually operated valve for controlling blending of water with the fertilizer; (7) does not utilize fertilizer supply module bags that may not be readily available; (8) does not employ a Venturi tube for dispensing the fertilizer; (9) is readily portable so it can readily be carried from location to location; (10) contains nozzles in its interior that direct water flow to facilitate good mixing between the water and the fertilizer; (11) contain appropriate automatically operating check valves that prevent unwanted flow of water when the apparatus is turned off; and (12) has a capability to manually mix an initial quantity of water with the fertilizer before the automatic mixing by water flow begins. The foregoing desired characteristics are provided by the unique water and fertilizer dispensing apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved water and fertilizer dispensing apparatus which includes a water source connector assembly for connecting to a source of pressurized water. A manually operated diverter valve assembly is connected to the water source connector assembly. The manually operated diverter valve assembly includes an input channel, a first output channel, a second output channel, and a selector valve assembly located between the input channel and both the first output channel and the second output channel. The selector valve assembly is used for manually selecting a water flow path from the input channel through either the first output channel, or the second output channel, or both the first output channel and the second output channel.

A mixing chamber is defined by a housing. The mixing chamber is connected to the first output channel. The mixing chamber is used for containing a quantity of fertilizer and a quantity of water for dissolving the fertilizer. The mixing chamber has a first linear dimension. An inflow nozzle assembly is connected to the first output channel within the mixing chamber. The inflow nozzle assembly is used for receiving water under pressure from the manually operated diverter valve assembly. The inflow nozzle assembly includes a plurality of apertures. An outflow aperture assembly is spaced from the inflow nozzle assembly by a predetermined distance, such that water entering the mixing chamber from the inflow nozzle assembly traverses the predetermined distance along the first linear dimension, before entering the outflow aperture assembly. A T-connector includes a first input channel, a second input channel, and an output channel. The first input channel is connected to the outflow aperture assembly. The second input channel is connected to the second output channel, and both the first input channel and second input channel are connected to the output channel. A distribution coupling assembly is connected to the output channel for connecting to an assembly for distributing material passing through the output channel.

A first one-way check valve is connected between the first output channel and the horizontal portion for preventing backflow of water from the horizonal portion to the first output channel. The predetermined distance is more than half the first linear dimension.

The inflow nozzle assembly includes a horizontal portion. The outflow aperture assembly includes a horizontal portion. The horizontal portion of the inflow nozzle assembly and the horizontal portion of the outflow aperture assembly are spaced apart by the predetermined distance.

A second one-way check valve is connected between the outflow aperture assembly and the first input channel for preventing backflow of water from the first input channel to the outflow aperture assembly. The housing defining the mixing chamber is cylindrical in shape, and the horizontal portion of the outflow aperture assembly is concentric with the cylindrical shape of the housing. The inflow nozzle assembly further includes a vertical portion.

In accordance with another aspect of the invention, a plurality of tubules are connected to the inflow nozzle assembly in registration with the apertures in the inflow nozzle assembly. The tubules are oriented away from the outflow aperture assembly, such that water outflowing from the tubules follows a circuitous path in the mixing chamber before entering the outflow aperture assembly for passage to the distribution coupling assembly. The tubules may be made from flexible material.

In accordance with yet another aspect of the invention, a cap fits onto the housing. The cap includes an aperture which receives a manually operated mixer assembly. The manually operated mixer assembly includes a plug element for fitting into the aperture in the cap. The plug element includes a central aperture, a handle received in the central aperture through a top of the plug element, a mixing element received in the central aperture through a bottom of the plug element. The mixing element is connected to the handle within the central aperture of the plug element, such that, by manually turning the handle, liquid and solid contents contained within the housing are mixed by the mixing element.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved water and fertilizer dispensing apparatus which has all of the advantages of the prior art and none of the disadvantages.

It is another object of the present invention to provide a new and improved water and fertilizer dispensing apparatus which may be easily and efficiently manufactured and marketed.

It is a further object of the present invention to provide a new and improved water and fertilizer dispensing apparatus which is of durable and reliable construction.

An even further object of the present invention is to provide a new and improved water and fertilizer dispensing apparatus which is susceptible of a low cost of manufacture with regard to both materials and labor, and which accordingly is then susceptible of low prices of sale to the consuming public, thereby making such water and fertilizer dispensing apparatus available to the buying public.

Still yet a further object of the present invention is to provide a new and improved water and fertilizer dispensing apparatus which permits application of the fertilizer to the ground without carrying the device back and forth over the ground being treated.

Still another object of the present invention is to provide a new and improved water and fertilizer dispensing apparatus that does not require subsequent watering of the ground after application of the fertilizer.

Yet another object of the present invention is to provide a new and improved water and fertilizer dispensing apparatus which avoids the use of a complex control system for dissolving solid fertilizer in water.

Even another object of the present invention is to provide a new and improved water and fertilizer dispensing apparatus that does not require the use of a separate fluid dispensing pump.

Still a further object of the present invention is to provide a new and improved water and fertilizer dispensing apparatus which provides complex mixing patterns between water and fertilizer to assure adequate mixing of the water and fertilizer.

Yet another object of the present invention is to provide a new and improved water and fertilizer dispensing apparatus that employs only one manually operated valve for controlling blending of water with the fertilizer.

Still another object of the present invention is to provide a new and improved water and fertilizer dispensing apparatus which does not utilize fertilizer supply module bags that may not be readily available.

Yet another object of the present invention is to provide a new and improved water and fertilizer dispensing apparatus that does not employ a Venturi tube for dispensing the fertilizer.

Still a further object of the present invention is to provide a new and improved water and fertilizer dispensing apparatus that is readily portable so it can readily be carried from location to location.

Yet another object of the present invention is to provide a new and improved water and fertilizer dispensing apparatus which contains nozzles in its interior that direct water flow to facilitate good mixing between the water and the fertilizer.

Still a further object of the present invention is to provide a new and improved water and fertilizer dispensing apparatus that contains appropriate automatically operating check valves that prevent unwanted flow of water when the apparatus is turned off.

Yet another object of the present invention is to provide a new and improved water and fertilizer dispensing apparatus which has a capability to manually mix an initial quantity of water with the fertilizer before the automatic mixing by water flow begins.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
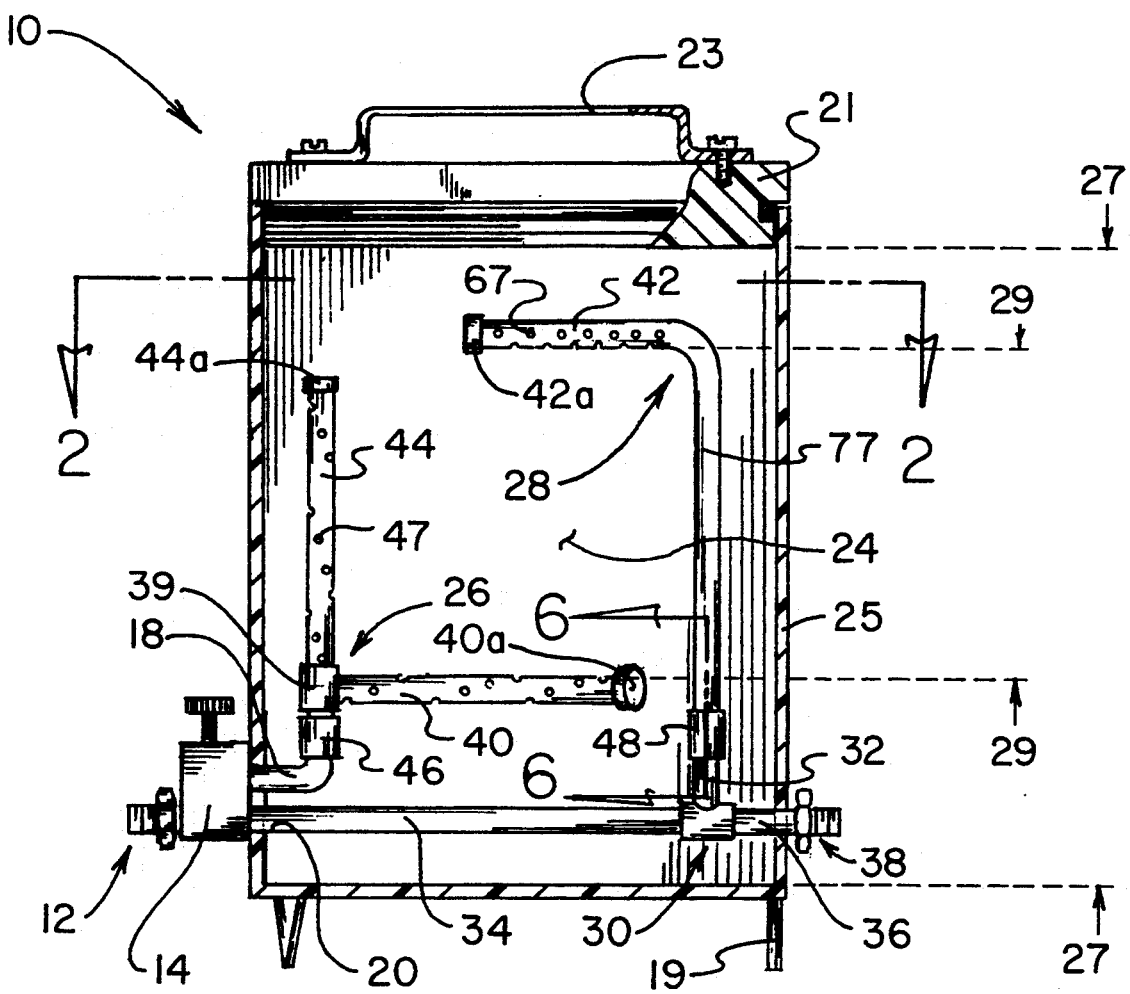
FIG. 1 is a cross-sectional view showing a first preferred embodiment of the water and fertilizer dispensing apparatus of the invention.

With reference to the drawings, a new and improved water and fertilizer dispensing apparatus embodying the principles and concepts of the present invention will be described.

Turning initially to FIGS. 1–6, there is shown a first exemplary embodiment of the water and fertilizer dispensing apparatus of the invention generally designated by reference numeral 10. In its preferred form, water and fertilizer dispensing apparatus 10 includes a water source connector assembly 12 for connecting to a source of pressurized water. The water source connector assembly 12 includes a standard threaded male end for connecting to a complementary standard female connector. A manually operated diverter valve assembly 14 is connected to the water source connector assembly 12. The manually operated diverter valve assembly 14 includes an input channel 16, a first output channel 18, a second output channel 20, and a selector valve assembly 22 located between the input channel 16 and both the first output channel 18 and the second output channel 20. The selector valve assembly 22 is used for manually selecting a water flow path from the input channel 16 through either the first output channel 18, or the second output channel 20, or both the first output channel 18 and the second output channel 20. The selector valve assembly 22 includes an handle 31, a shaft 33, and a valve element 35 connected to the shaft 33 and controlled by the handle 31.

A mixing chamber 24 is defined by a housing 25. The mixing chamber 24 is connected to the first output channel 18. The mixing chamber 24 is used for containing a quantity of fertilizer and a quantity of water for dissolving the fertilizer. The mixing chamber 24 has a first linear dimension 27. The housing 25 has an air tight cover 21 which has a handle 23. The housing 25 also has legs 19. An inflow nozzle assembly 26 is connected to the first output channel 18 within the mixing chamber 24.

The inflow nozzle assembly 26 is used for receiving water under pressure from the manually operated diverter valve assembly 14. The inflow nozzle assembly 26 includes a plurality of apertures 47. The apertures 47 may be drilled in a directional manner so that desirable currents of water can circulate in the mixing chamber 24. The plurality of apertures 47 can be present in a number such that the surface area defined by the apertures 47 is equal to or greater than the surface area defined by the diameter of the pipe forming the vertical portion 44 of the inflow nozzle assembly 26. The apertures 47 cause water to circulate substantially throughout the mixing chamber 24 before water exits from the mixing chamber 24 through the outflow aperture assembly 28. Due to the apertures 47, the water may circulate in the mixing chamber 24 in the manner of a whirlpool. An outflow aperture assembly 28 is spaced from the inflow nozzle assembly 26 by a predetermined distance 29, such that water entering the mixing chamber 24 from the inflow nozzle assembly 26 traverses the predetermined distance 29 along the first linear dimension 27, before entering the outflow aperture assembly 28. Water which circulates in the mixing chamber 24 is driven by the pressure from the water source. The circulating water enters apertures 67 in the horizontal portion 42 of the outflow aperture assembly 28.

The number of apertures 67 is provided so that the surface area defined by the apertures 67 is greater than the surface area defined by the diameter of the horizontal portion 42. An air space is created by the air tight cover 21 and a predetermined space between a horizontal portion 42 of the outflow aperture assembly 28. No apertures are present in the vertical portion 77 of the outflow aperture assembly 28. The air space allows better agitation and also can serve to effect a pulse effect on driving the fertilizer solution out through the distribution coupling assembly 38 by causing momentary expansion of the trapped air. A T-connector 30 includes a first input channel 32, a second input channel 34, and an output channel 36. The first input channel 32 is connected to the outflow aperture assembly 28. The second input channel 34 is connected to the second output channel 20 by the straight pipe shown, and both the first input channel 32 and second input channel 34 are connected to the output channel 36.

A distribution coupling assembly 38 is connected to the output channel 36 for connecting to an assembly for distributing material passing through the output channel 36. A garden hose can carry water from the source to the water and fertilizer dispensing apparatus 10 of the invention. The distribution coupling assembly 38 includes a standard threaded male end that is complementary to a standard female end of a distributing device such as a garden hose or a sprinkler system.

There are three cases for which the valve element 35 can be selectively adjusted. In each case, fertilizer is first added to the mixing chamber 24 by temporarily removing the cap 21. After the fertilizer is added, the cap 21 is replaced.

In the first case, the valve element 35 is adjusted to completely block second output channel 20 and to completely open the first output channel 18. In this case, all of the water flowing through input channel 16 enters first output channel 18, passes through the inflow nozzle assembly 26, passes through the predetermined distance 29 in the mixing chamber 24, enters the outflow aperture assembly 28, enters the first input channel 32, enters the output channel 36, and exits from the distribution coupling assembly 38. In this case the fertilizer-water solution is applied full strength.

In the second case, the valve element 35 is adjusted to completely block the first output channel 18 and to completely open the second output channel 20. In this case, the entire fertilizer dissolving assembly is shunted, and water runs straight from the second output channel 20, through the second input channel 34 of the T-connector 30, through the output channel 36, and out from the distribution coupling assembly 38. In this case, no fertilizer is applied at all. Substantially pure water exits from the distribution coupling assembly 38.

In the third case, the valve element 35 is adjusted to partially block and partially open both the first output channel 18 and the second output channel 20. This third case actually includes a continuous family of cases where a selected ratio of fertilizer to water can be selected to exit from the distribution coupling assembly 38. A first one-way check valve 46 is connected between the first output channel 18 and assembly 26 for preventing backflow of water from the horizontal portion 40 to the first output channel 18. The first one-way check valve 46 prevents a siphoning action when water pressure is no longer present at water source connector assembly 12. The predetermined distance 29 is more than half the first linear dimension 27.

Figure 2:
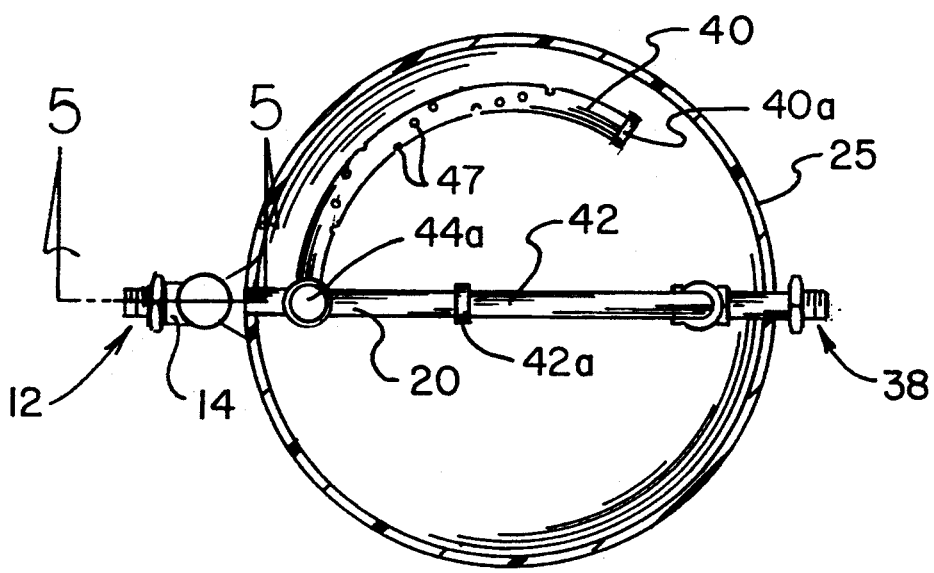
FIG. 2 is a cross-sectional view of the water and fertilizer dispensing apparatus shown in FIG. 1 taken along line 2—2 of FIG. 1.
Figure 4:
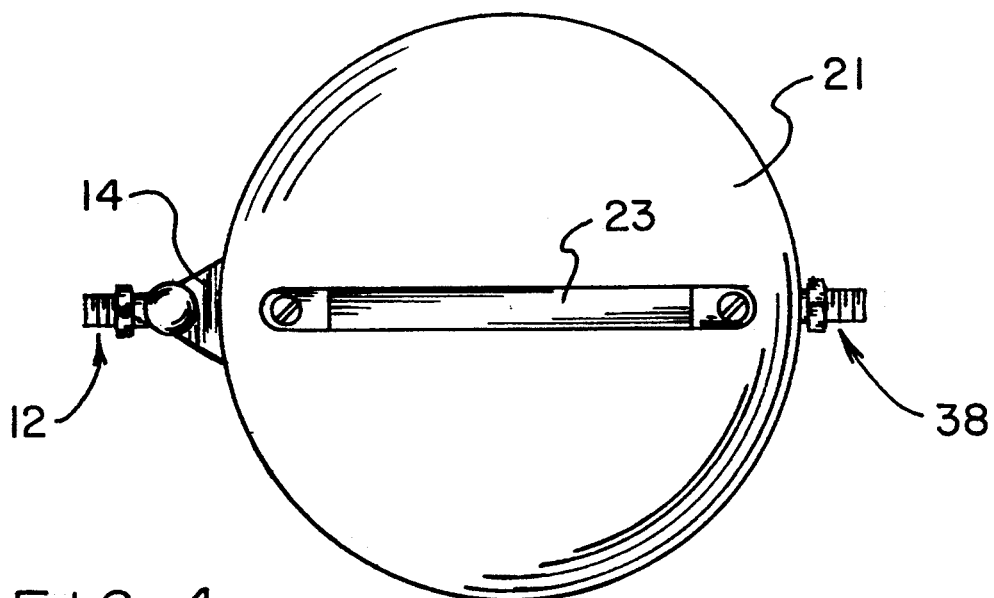
FIG. 4 is a top view of the water and fertilizer dispensing apparatus of FIG. 1.
Figure 3:
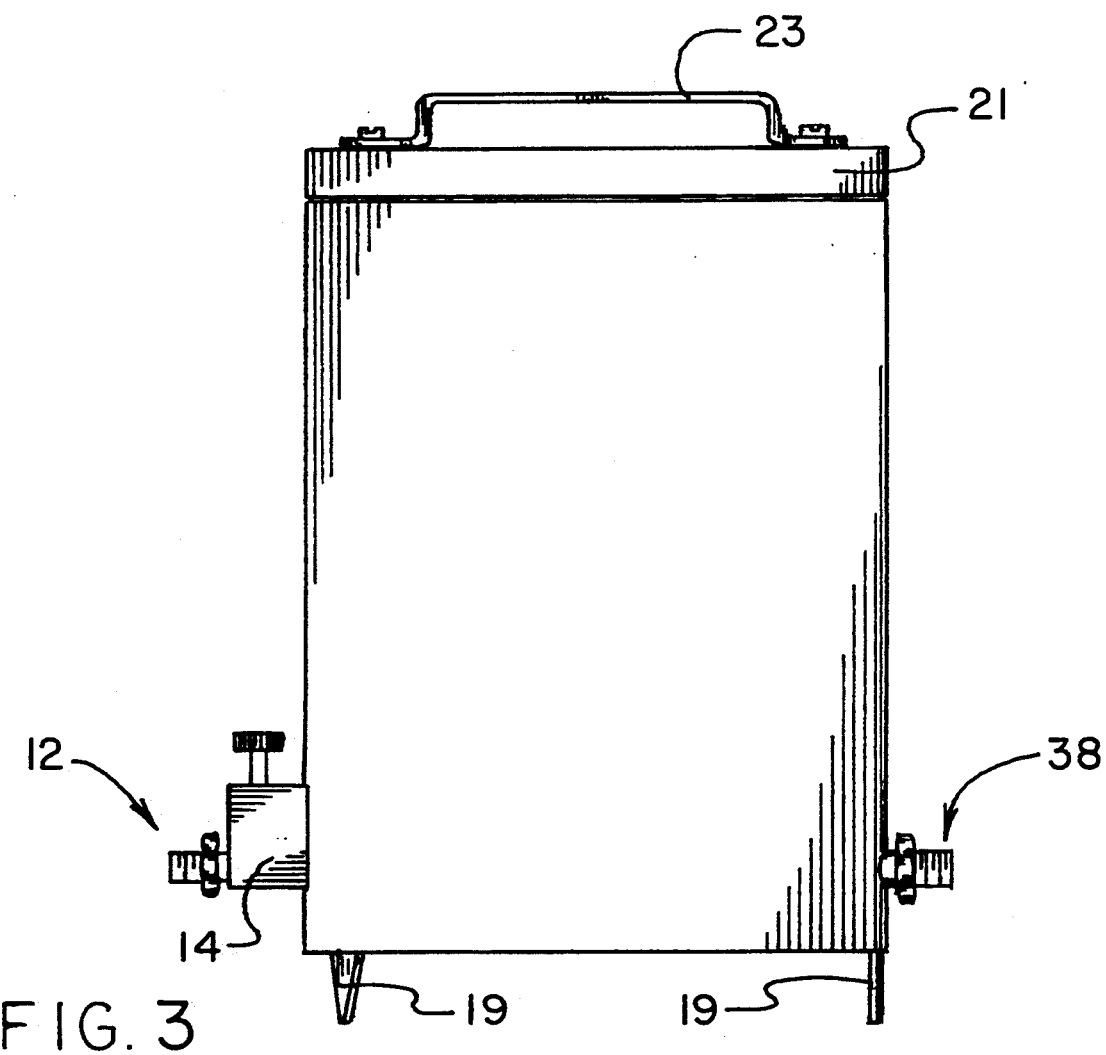
FIG. 3 is a side view of the embodiment of the invention shown in FIG. 1.
Figure 5:
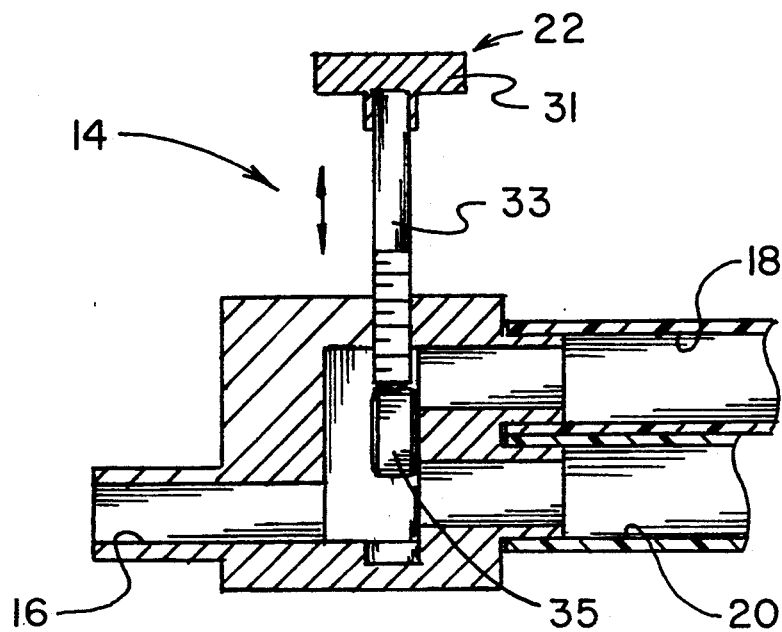
FIG. 5 is a cross-sectional view of the manually operated diverter valve in the embodiment of the invention shown in FIG. 2 taken along the line 5—5 in FIG. 2.

The inflow nozzle assembly 26 includes a horizontal portion 40 which includes apertures 47 similar to those in vertical portion 44 with both horizontal portion 40 and vertical portion 44 being fed by T-connector 39 attached to output channel 18 after valve 46 as best seen in FIGS. 1 and 2. The outflow aperture assembly 28 includes a horizontal portion 42. The horizontal portion 40 of the inflow nozzle assembly 26 and the horizontal portion 42 of the outflow aperture assembly 28 are spaced apart by the predetermined distance 29.

Figure 6:
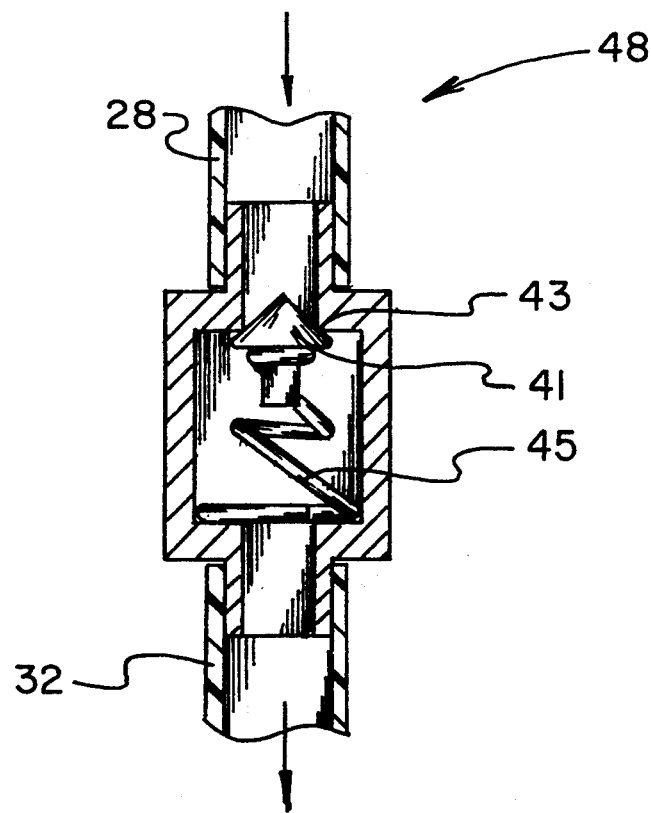
FIG. 6 is a cross-sectional view of an automatically operating check valve shown in the embodiment in FIG. 1 taken along the line 6—6 thereof.

As shown in FIG. 6, a second one-way check valve 48 is connected between the outflow aperture assembly 28 and the first input channel 32 for preventing backflow of water from the first input channel 32 to the outflow aperture assembly 28. More specifically, the second one-way check valve 48 includes a conical valve element 41, a valve seat 43, and a biasing spring 45. The second one-way check valve 48 permits one-way flow from the outflow aperture assembly 28 to the first input channel 32.

The housing 25 defining the mixing chamber 24 is cylindrical in shape, and the horizontal portion 40 of the inflow assembly 26 is arcuately shaped so as to be concentric with the cylindrical shape of the housing 25 substantially as shown.

It will be noted that vertical portion 44 and horizontal portion 40 of inflow assembly 26 are suitably terminated by end caps 44a and 40a, respectively. Similarly, horizontal portion 42 of outflow assembly 28 is suitably terminated by end cap 42a. End caps 44a, 40a and 42a assure that water is forced through apertures 47 of input assembly 26 under pressure and that the water/fertilizer mixture enters apertures 67 in the horizontal portion of assembly 28 under pressure, respectively.

Figure 7:
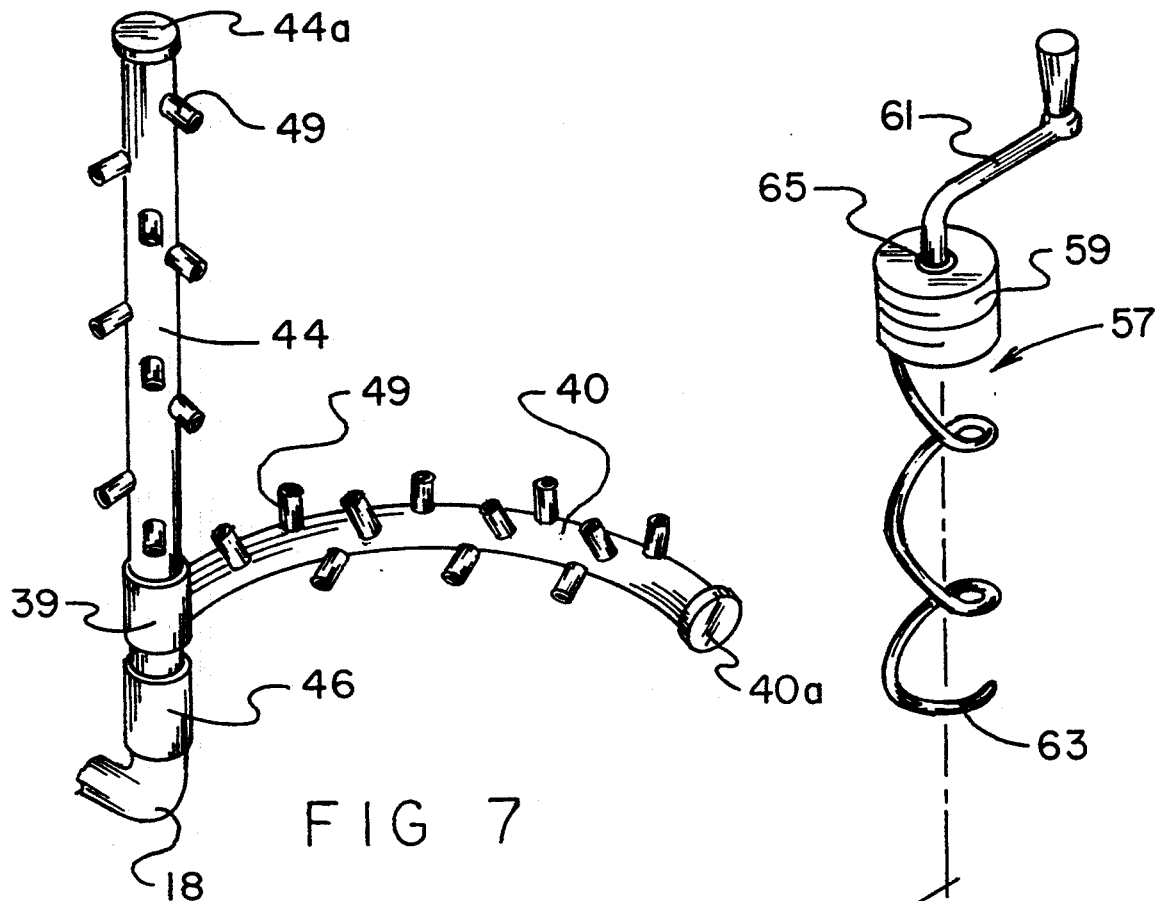
FIG. 7 a perspective view of a second embodiment of the mixing nozzle array of the water and fertilizer dispensing apparatus of the invention.

Turning to FIG. 7, a second embodiment of the invention is shown. Reference numerals are shown that correspond to like reference numerals that designate like elements shown in the other figures. In addition, a plurality of tubules 49 are connected to the inflow nozzle assembly 26 in registration with the apertures 47 in the inflow nozzle assembly 26. The tubules 49 can be connected to the inflow nozzle assembly 26 by a water-resistant adhesive. Alternatively, the tubules 49 can be formed as a unitary, integrated structure with the inflow nozzle assembly 26. The tubules 49 are oriented away from the outflow aperture assembly 28, such that water outflowing from the tubules 49 follows a circuitous path in the mixing chamber 24 before entering the outflow aperture assembly 28 for passage to the distribution coupling assembly 38. The tubules 49 may be made from flexible material such as rubber.

Figure 8:
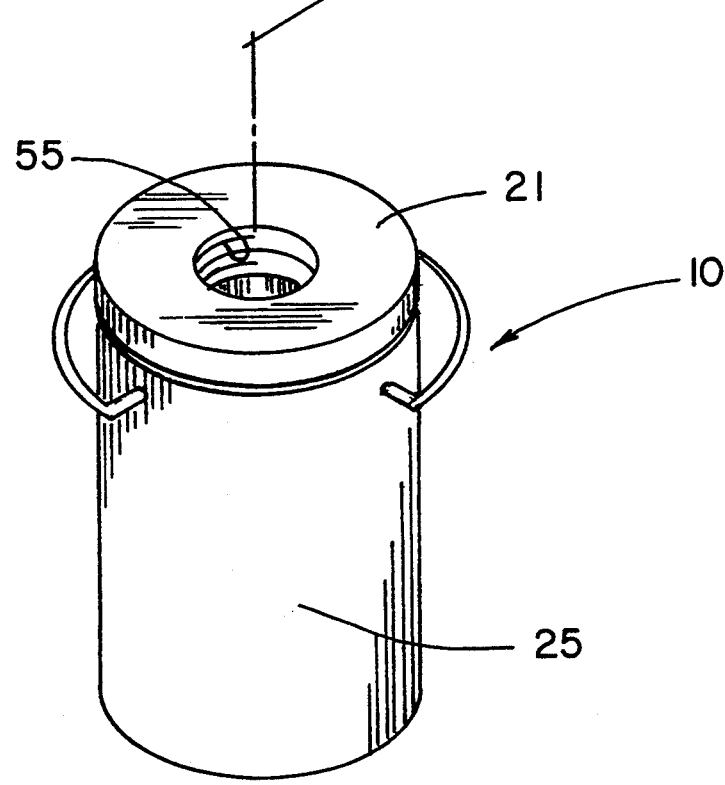
FIG. 8 is an exploded perspective view of a third embodiment of the water and fertilizer dispensing apparatus of the invention which employs a manually operated mixer.

Turning to FIG. 8, a third embodiment of the invention is shown. Reference numerals are shown that correspond to like reference numerals that designate like elements shown in the other figures. In addition, a cap 21 fits onto the housing 25, and the cap 21 includes an aperture 55 which receives a manually operated mixer assembly 57. The manually operated mixer assembly 57 includes a plug element 59 for fitting into the aperture 55 in the cap 21. The plug element 59 includes a central aperture 65, a handle 61 received in the central aperture 65 through a top of the plug element 59, a mixing element 63 received in the central aperture 65 through a bottom of the plug element 59. The mixing element 63 is connected to the handle 61 within the central aperture 65 of the plug element 59, such that, by manually turning the handle 61, liquid and solid contents contained within the housing 25 are mixed by the mixing element 63.

If desired, a third one-way check valve (not shown) may be placed before input coupling 12 and diverter valve assembly 14 to prevent back flow or siphoning from the output channel along channel 34.

The water and fertilizer dispensing apparatus of the invention can be made to have an appearance that is pleasant to the eye. More specifically, the water and fertilizer dispensing apparatus can be in the form of a milk can.

The water and fertilizer dispensing apparatus can be fabricated from metal or plastic materials. A suitable plastic material is polyvinylchloride (PVC).

It is apparent from the above that the present invention accomplishes all of the objects set forth by providing a new and improved water and fertilizer dispensing apparatus that is low in cost, relatively simple in design and operation, and which permits application of the fertilizer to the ground without carrying the device back and forth over the ground being treated. With the invention, a water and fertilizer dispensing apparatus is provided which does not require subsequent watering of the ground after application of the fertilizer. With the invention, a water and fertilizer dispensing apparatus is provided which avoids the use of a complex control system for dissolving solid fertilizer in water. With the invention, a water and fertilizer dispensing apparatus is provided which does not require the use of a separate fluid dispensing pump. With the invention, a water and fertilizer dispensing apparatus is provided which provides complex mixing patterns between water and fertilizer to assure adequate mixing of the water and fertilizer. With the invention, a water and fertilizer dispensing apparatus is provided which employs only one manually operated valve for controlling blending of water with the fertilizer. With the invention, a water and fertilizer dispensing apparatus is provided which does not utilize fertilizer supply module bags that may not be readily available.

In addition, with the invention, a water and fertilizer dispensing apparatus is provided which does not employ a Venturi tube for dispensing the fertilizer. With the invention, a water and fertilizer dispensing apparatus is provided which is readily portable so it can readily be carried from location to location. With the invention, a water and fertilizer dispensing apparatus is provided which contains nozzles in its interior that direct water flow to facilitate good mixing between the water and the fertilizer. With the invention, a water and fertilizer dispensing apparatus is provided which contains appropriate automatically operating check valves that prevent unwanted flow of water when the apparatus is turned off. With the invention, a water and fertilizer dispensing apparatus is provided which has a capability to manually mix an initial quantity of water with the fertilizer before the automatic mixing by water flow begins.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patents of the United States is as follows:

1. A new and improved water and fertilizer dispensing apparatus, comprising:

a water source connector assembly for connecting to a source of pressurized water, a manually operated diverter valve assembly connected to said water source connector assembly, said manually operated diverter valve assembly including an input channel, a first output channel, a second output channel, and a selector valve assembly located between said input channel and both said first output channel and said second output channel, said selector valve assembly for manually selecting a water flow path from said input channel through either said first output channel, or said second output channel, or both said first output channel and said second output channel, a mixing chamber defined by a housing, said mixing chamber connected to said first output channel, said mixing chamber for containing a quantity of fertilizer and a quantity of water for the fertilizer, said mixing chamber having a first linear dimension, an inflow nozzle assembly connected to said first output channel within said mixing chamber, said inflow nozzle assembly for receiving water under pressure from said manually operated diverter valve assembly, said inflow nozzle assembly including a plurality of apertures, an outflow aperture assembly spaced from said inflow nozzle assembly by a predetermined distance, such that water entering said mixing chamber from said inflow nozzle assembly traverses said predetermined distance along said first linear dimension, before entering said outflow aperture assembly, a T-connector which includes a first input channel, a second input channel, and an output channel, wherein said first input channel is connected to said outflow aperture assembly, said second input channel is connected to said second output channel, and both said first input channel and second input channel are connected to said output channel, and a distribution coupling assembly connected to said output channel for connecting to an assembly for distributing material passing through said output channel.

2. The apparatus described in claim 1 wherein:
said inflow nozzle assembly includes a horizontal portion,
said outflow aperture assembly includes a horizontal portion, and
said horizontal portion of said inflow nozzle assembly and said horizontal portion of said outflow aperture assembly are spaced apart by said predetermined distance.

3. The apparatus described in claim 2, further including:
a first one-way check valve connected between said first output channel and said horizontal portion for preventing backflow of water from said horizontal portion to said first output channel.

4. The apparatus described in claim 2 wherein said predetermined distance is more than half said first linear dimension.

5. The apparatus described in claim 1, further including:
a second one-way check valve connected between said outflow aperture assembly and said first input channel for preventing backflow of water from said first input channel to said outflow aperture assembly.

6. The apparatus described in claim 2 wherein:
said housing defining said mixing chamber is cylindrical in shape, and
said horizontal portion of said outflow aperture assembly is concentric with the cylindrical shape of said housing.

7. The apparatus described in claim 2 wherein said inflow nozzle assembly further includes a vertical portion.

8. The apparatus described in claim 1, further including:
a plurality of tubules connected to said inflow nozzle assembly in registration with said apertures in said inflow nozzle assembly.

9. The apparatus described in claim 8 wherein said tubules are oriented away from said outflow aperture assembly, such that water outflowing from said tubules follows a circuitous path in said mixing chamber before entering said outflow aperture assembly for passage to said distribution coupling assembly.

10. The apparatus described in claim 8 wherein said tubules are made from flexible material.

11. The apparatus described in claim 1, further including:
a cap for fitting onto said housing, wherein said cap includes an aperture which receives a manually operated mixer assembly.

12. The apparatus described in claim 11 wherein said manually operated mixer assembly includes:
a plug element for fitting into said aperture in said cap, said plug element including a central aperture,
a handle received in said central aperture through a top of said plug element, and
a mixing element received in said central aperture through a bottom of said plug element, said mixing element connected to said handle within said central aperture of said plug element, such that, by manually turning said handle, liquid contents contained within said housing are mixed by said mixing element.

* * * * *